(12) United States Patent
Johnson

(10) Patent No.: US 9,086,289 B2
(45) Date of Patent: Jul. 21, 2015

(54) LOCATION POINT DETERMINATION APPARATUS, MAP GENERATION SYSTEM, NAVIGATION APPARATUS AND METHOD OF DETERMINING A LOCATION POINT

(75) Inventor: Terry William Johnson, Grantham, NH (US)

(73) Assignee: TomTom North America, Inc., Lebanon, NH (US)

( * ) Notice: Subject to any disclaimer, the term of this patent is extended or adjusted under 35 U.S.C. 154(b) by 489 days.

(21) Appl. No.: 13/318,798

(22) PCT Filed: Apr. 29, 2010

(86) PCT No.: PCT/US2010/032895
§ 371 (c)(1),
(2), (4) Date: Jan. 20, 2012

(87) PCT Pub. No.: WO2010/129380
PCT Pub. Date: Nov. 11, 2010

(65) Prior Publication Data
US 2012/0136895 A1    May 31, 2012

Related U.S. Application Data

(60) Provisional application No. 61/215,238, filed on May 4, 2009.

(51) Int. Cl.
*G06F 17/30* (2006.01)
*G01C 21/32* (2006.01)
*G09B 29/10* (2006.01)

(52) U.S. Cl.
CPC .......... *G01C 21/32* (2013.01); *G06F 17/30241* (2013.01); *G09B 29/102* (2013.01)

(58) Field of Classification Search
CPC ...................... G01C 21/32; G06F 17/30241
USPC ........................................................ 707/705
See application file for complete search history.

(56) References Cited

U.S. PATENT DOCUMENTS

| | | | |
|---|---|---|---|
| 6,184,823 B1 * | 2/2001 | Smith et al. | 342/357.31 |
| 7,054,745 B1 | 5/2006 | Couckuyt et al. | |
| 7,689,582 B2 * | 3/2010 | Behnen et al. | 707/999.102 |
| 8,484,199 B1 * | 7/2013 | Katragadda et al. | 707/723 |
| 2005/0261822 A1 | 11/2005 | Wako | |
| 2006/0287819 A1 * | 12/2006 | Brulle-Drews et al. | 701/211 |
| 2007/0143345 A1 | 6/2007 | Jones et al. | |
| 2007/0271030 A1 | 11/2007 | Deurwaarder | |
| 2007/0276845 A1 * | 11/2007 | Geilich | 707/100 |
| 2008/0163073 A1 | 7/2008 | Becker et al. | |
| 2011/0257883 A1 * | 10/2011 | Kuznetsov | 701/209 |

OTHER PUBLICATIONS

International Search Report issued Jun. 30, 2010 for International Application No. PCT/US2010/032895.

* cited by examiner

*Primary Examiner* — Dinku Gebresenbet

(57) ABSTRACT

A location point determination apparatus comprises a geographic feature harvesting module (202) arranged to access and collect, when in use, geographic feature information associated with a predetermined named area datum. The apparatus also comprises a data assessment module (208) arranged to receive the geographic feature information collected by the geographic feature harvesting module and to evaluate from the geographic feature information collected in respect of at least one attribute of each geographic feature associated with the geographic feature information. The apparatus further comprises a selection module (210) arranged to select a geographic feature from the geographic features evaluated in accordance with a predetermined criterion associated with the evaluation of the geographic feature information.

21 Claims, 13 Drawing Sheets

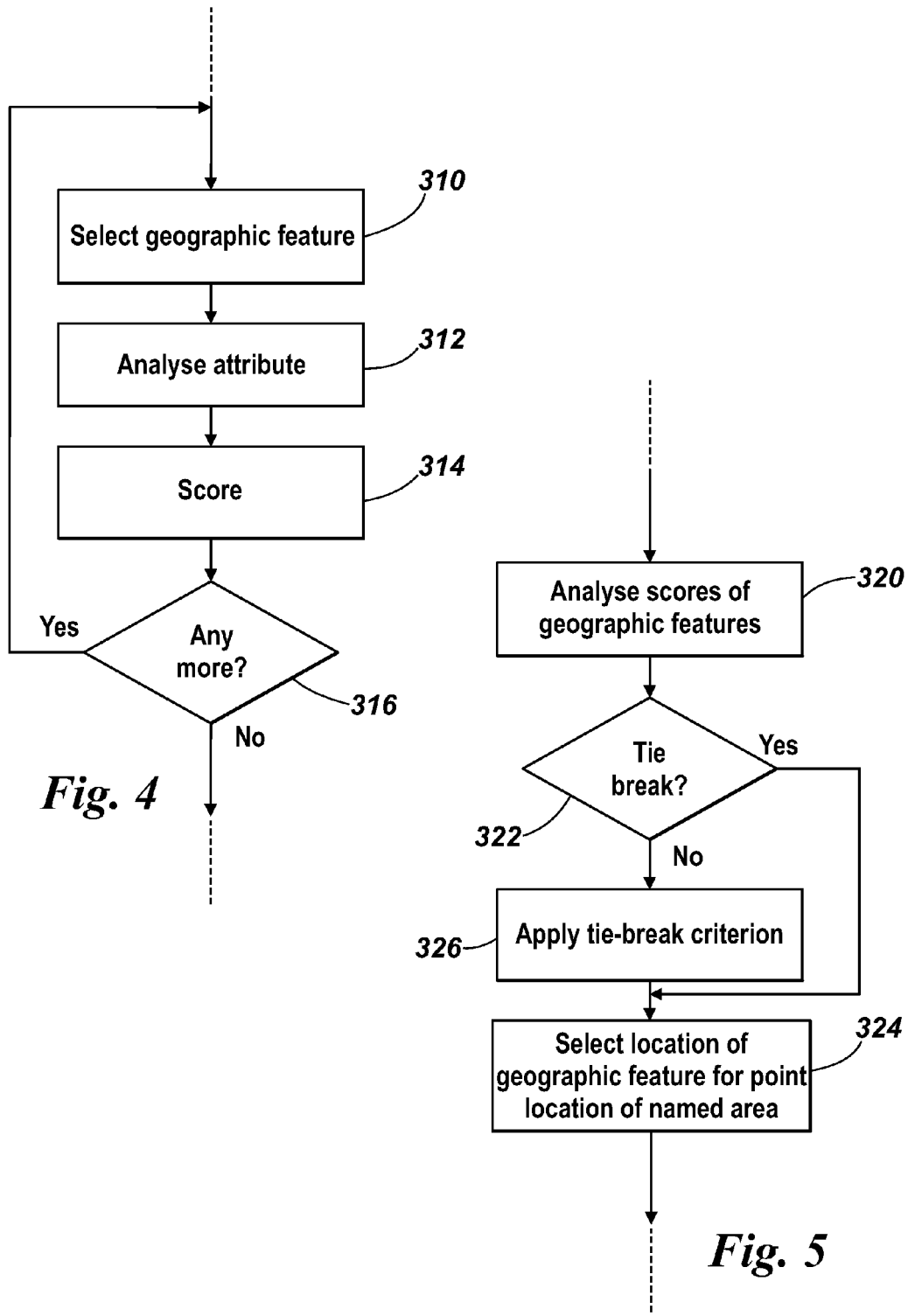

LOCATION POINT DETERMINATION APPARATUS, MAP GENERATION SYSTEM, NAVIGATION APPARATUS AND METHOD OF DETERMINING A LOCATION POINT

This application is the National Stage of International Application No. PCT/US2010/032895, filed 29 Apr. 2010 and designating the United States. This application also claims the benefit of priority from U.S. Provisional Application No. 61/215,238, filed on 4 May 2009. The entire content of these applications is incorporated herein by reference.

FIELD OF THE INVENTION

The present invention relates to a location point determination apparatus of the type that, for example, processes map data in order to provide a location point representative of a named area. The present invention also relates to a map generation system of the type that, for example, processes map data in order to provide a location point representative of a named area for generation of a map product. The present invention also relates to a navigation apparatus of the type that, for example, provides a location point representative of a named area specified by a user. The present invention further relates to a method of determining a location point, the method being of the type that, for example, processes map data in order to provide a location point representative of a named area.

BACKGROUND TO THE INVENTION

In the field of Geographic Information Systems (GIS), it is known to capture, analyse, manage, and present data associated with locations. In this regard, GIS are known to enrich cartographic information using database technology in order to generate information-rich cartographic data.

In relation to a digital map, a vast number of so-called "named areas" exist in relation to a geographic area or locality, for example, hundreds of thousands of named areas exists alone in respect of the United States of America. Users of digital map data sometimes need to refer to a named area for the purpose of, for example, navigation. However, identifying a specific location, in terms of longitude and latitude coordinates, in order to represent a named area, is a challenge faced by creators of digital maps, because it is not easy to select and assign coordinates to identify a location that is most appropriate to represent the named area when a large number of candidate locations exist.

One known technique for assigning navigation destinations is by manual assignment. Typically, manual assignment requires the use of an editor application operated by a Digital Map Technician (DMT), the behaviour of which is bound by a set of rules and a procedure to follow when assigning navigation destinations to named areas. However, the process of manual assignment is limited by the limitations of manual labour, for example complexity of rules to be performed and any associated calculations, but is also an expensive process on account of the use of the manual labour. Consequently, the number of named areas that can be processed is limited and map databases are often incomplete and comprise named areas for which navigation destinations are not assigned. Furthermore, manual selection of the most suitable location can be subjective. The use of the manual process also limits the assignment of navigation destinations to the map editing environment.

In order to mitigate the cost of generation of the navigation destinations, it is sometimes known to use navigation destinations of the same name but from other named areas in order to create new navigation destinations for named areas. However, another navigation destination of the same name may relate to another named area that does not overlap or is not even adjacent the named area for which a location point needs to be assigned. For example, a navigation destination for Queens Village, N.Y. might also be assigned as the navigation destination for Long Island City, N.Y., simply because the navigation destination in Long Island City, N.Y., has the same name as the named area for which a navigation destination needs to be assigned. This can result in undesirable instances of mis-navigation if the assigned navigation destination is used.

Additionally, navigation destinations are typically generated in the context of vehicular navigation. Consequently, the context of the navigation destinations is not appropriate for all types of navigation, such as pedestrian navigation.

Hence, it is desirable to assign location points to named areas in a flexible, cost-effective, complete, accurate and consistent manner.

SUMMARY OF THE INVENTION

According to a first aspect of the present invention, there is provided a location point determination apparatus comprising: a geographic feature harvesting module arranged to access and collect, when in use, geographic feature information associated with a predetermined named area datum; a data assessment module arranged to receive the geographic feature information collected by the geographic feature harvesting module and to evaluate the geographic feature information collected in respect of at least one attribute of each geographic feature associated with the geographic feature information; and a selection module arranged to select a geographic feature from the geographic features evaluated, the selection being in accordance with a predetermined criterion associated with the evaluation of the geographic feature information.

An identity of the selected geographic feature may be stored in a geospatial database. The identity of the selected geographic feature may be stored by a server. The identity of the selected geographic feature may be stored by a navigation apparatus.

The geographic feature may be a node. The geographic feature may be a landmark. The geographic feature may be located at a point along a road segment.

The geographic feature harvesting module may be arranged to access, when in use, a map database comprising the geographic feature information; the geographic feature information may comprise respective attributes associated with the geographic feature.

The at least one attribute evaluated by the data assessment module may comprise a valence.

The at least one attribute may be evaluated by the data assessment module comprises a feature class.

The selection module may be arranged to obtain a seed location; the predetermined criterion used by the selection module may be proximity of the geographic feature with respect to the seed location.

The apparatus may further comprise a reference centre calculator module arranged to determine a reference centre point with respect to the named area. The reference centre calculator module may be arranged to determine the reference centre point by calculating a centroid with respect to a boundary associated with the named area. The boundary may be determined by selecting geospatial objects associated with the named area that bound a maximum area.

The geospatial objects may comprise outermost segments associated with the names area. The outermost segments may comprise road segments. The geospatial objects may comprise a polygonal area, for example a zip code or postal code boundary. The geospatial objects may comprise a point, for example a point of interest.

The boundary may be a complex hull.

The centroid may be a weighted centroid. The weighted centroid may be within the boundary associated with the named area.

The predetermined criterion used by the selection module may be proximity of the geographic feature with respect to the reference centre point.

The data assessment module may also evaluate proximity of the each geographic feature with respect to the reference centre point.

The proximity of the geographic feature with respect to the reference centre point may be calculated using a mode of calculation based upon one of: a straight-line distance, a driving distance, a driving time, or a walking time.

The selection module may be arranged to select the basis of the mode of calculation of the proximity in accordance with an application of the named area datum.

The data assessment module may be arranged to select the basis of the mode of calculation of the proximity in accordance with an application of the named area datum.

The application may be vehicle or pedestrian or multimodal navigation.

The data assessment module may be arranged to evaluate the geographic feature information collected with reference to a hierarchy of preference. The hierarchy of preference may be arranged to be application-specific.

The apparatus may further comprise a processing resource arranged to support the geographical feature harvesting module, the data assessment module and the selection module. The processing resource may be arranged to organise the geographic feature information collected in a spatial index.

According to a second aspect of the present invention, there is provided a map generation system comprising: a location point determination apparatus as set forth above in relation to the first aspect of the invention; a master digital map database; and a repository of a number of named areas; and a map export module arranged to generate a map product; wherein the location point determining apparatus is arranged to access the repository of named areas and provide in respect of each of the number of named areas a geographic feature selected by the selection module; and the map export module is arranged to generate the map product using the master digital map database and location information associated with the geographic features selected in order to generate the map product having the number of named areas respectively identified as being at the locations of the geographic features selected.

The map product may store a named area of the respectively identified number of named areas for expression in an annotation form.

According to a third aspect of the present invention, there is provided a navigation assistance processing apparatus comprising: a processing resource arranged to support a location point determination apparatus as set forth above in relation to the first aspect of the invention; and an input interface; wherein the processing resource is arranged to receive the predetermined named area datum via the input interface; the location point determination apparatus is arranged to identify the geographic feature selected; and the processing resource is arranged to use a location of the geographic feature selected as a navigation destination.

According to a fourth aspect of the present invention, there is provided a navigation apparatus comprising the navigation assistance processing apparatus as set forth above in relation to the third aspect of the invention.

According to a fifth aspect of the present invention, there is provided a navigation assistance server apparatus for receiving a request for a location data associated with a predetermined and identified named area datum, the apparatus comprising: the navigation assistance processing apparatus as set forth above in relation to the first aspect of the invention; a wireless communications interface comprising the input interface of the navigation assistance processing apparatus for receiving the identified named area datum from a navigation apparatus via a communications network; wherein the processing resource is arranged to communicate the identity of the geographic feature via the wireless communications interface for receipt by the navigation apparatus.

The navigation apparatus may comprise a route selection module. The navigation apparatus may comprise a route calculation module.

According to a sixth aspect of the present invention, there is provided a method of determining a location point associated with a named area, the method comprising: accessing and collecting geographic feature information associated with a predetermined named area datum; receiving the geographic feature information collected; evaluating from the geographic feature information collected in respect of at least one attribute of each geographic feature associated with the geographic feature information; and selecting a geographic feature from the geographic features evaluated, the selection being in accordance with a predetermined criterion associated with the evaluation of the geographical feature information.

According to a seventh aspect of the present invention, there is provided a computer program element comprising computer program code means to make a computer execute the method as set forth above in relation to the sixth aspect of the invention.

The computer program element may be embodied on a computer readable medium.

Advantages of these embodiments are set out hereafter, and further details and features of each of these embodiments are defined in the accompanying dependent claims and elsewhere in the following detailed description.

It is thus possible to provide a location point determining apparatus, a map generation system, a navigation apparatus and method of determining a location point that are capable of assigning location points to a large number of named areas in a fully automated manner, as well as in an efficient and cost-effective manner. Furthermore, the accuracy of the location points assigned is increased because the location points being assigned are within the named area to which the location points are to relate. The flexibility mentioned above relates to the ability of the point location determination technique to be used not only for map product generation, but also for runtime navigation applications where a user specifies a named area and the navigation apparatus determines a location point representative of the named area. Evaluation of feature attributes can thus be customised by a user depending upon different user needs, for example navigation assistance when driving or walking.

BRIEF DESCRIPTION OF THE DRAWINGS

At least one embodiment of the invention will now be described, by way of example only, with reference to the accompanying drawings, in which:

FIG. 4 is a flow diagram of a part of the method of FIG. 3 in greater detail;

FIG. 5 is a flow diagram of another part of the method of FIG. 3 in greater detail;

DETAILED DESCRIPTION OF PREFERRED EMBODIMENTS

Figure 1:
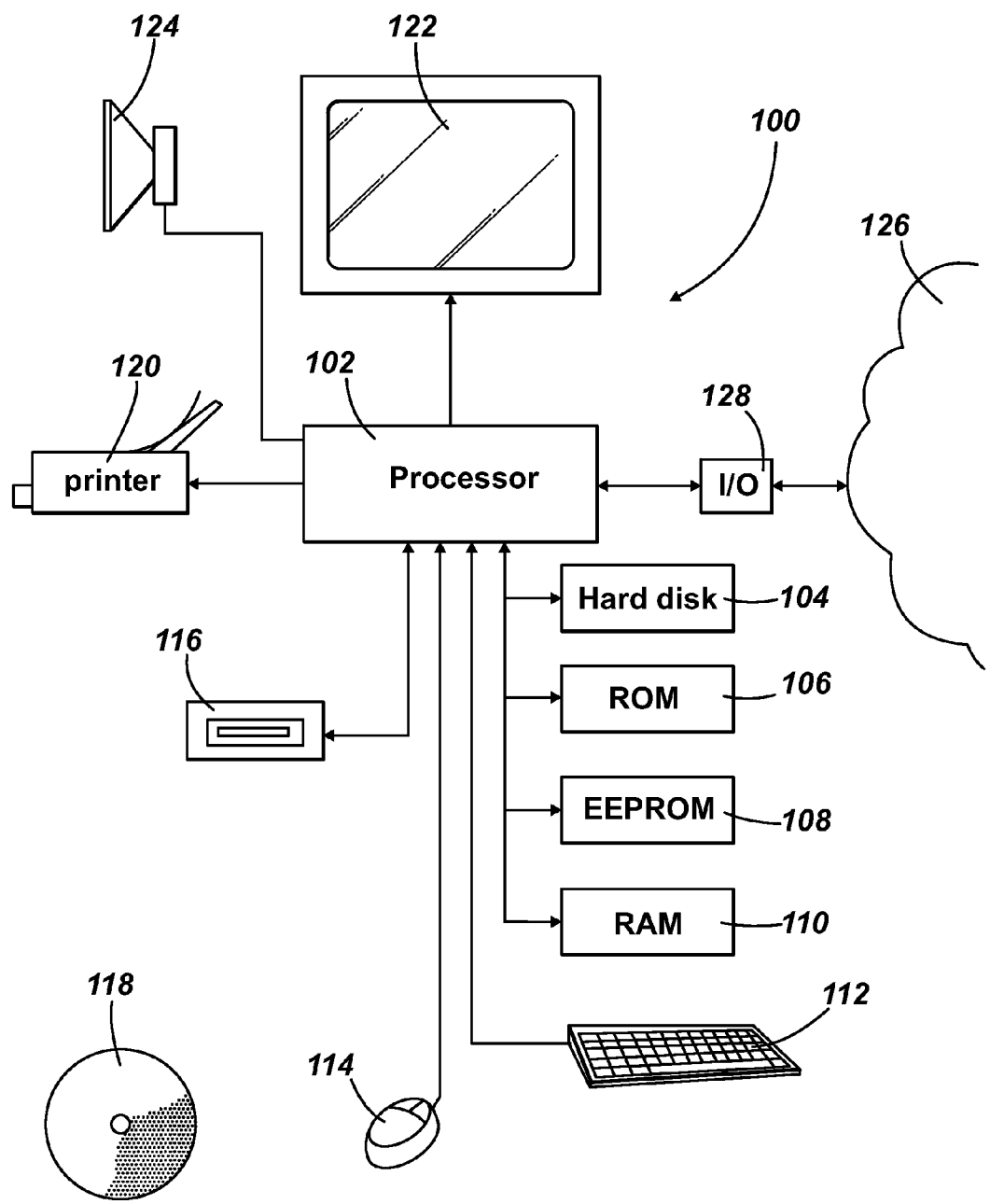
FIG. 1 is a schematic diagram of a computing arrangement that supports a location point determination apparatus constituting an embodiment of the invention.

Throughout the following description identical reference numerals will be used to identify like parts.

Referring to FIG. 1, an overview is given of a computing arrangement 100 comprising a processing resource 102, for example a processor, such as a microprocessor.

The processor 102 is coupled to a plurality of storage components, including a hard disk drive 104, a Read Only Memory (ROM) 106, an Electrical Erasable Programmable Read Only Memory (EEPROM) 108, and a Random Access Memory (RAM) 110. Not all of the memory types described above need necessarily be provided. Moreover, these storage components need not be located physically close to the processor 102 but can be located remotely from the processor 102.

The processor 102 is also coupled to one or more input devices for inputting instructions and data, by a user, for example a keyboard 112 and a mouse 114. Other input devices, for example a touch screen input unit, a trackball and/or a voice recognition unit, or any other input device, known to persons skilled in the art, can also be provided.

A removable media unit 116 coupled to the processor 102 is provided. The removable media unit 116 is arranged to read data from and possibly write data to a removable data carrier or removable storage medium, for example a Compact Disc-ReWritable (CD-RW) disc 118. In other examples, the removable data carriers can be, for example: tapes, DVDs, CD-Rs, DVD-Rs, CD-ROMs, DVD-RAMs, or memory sticks as is known to persons skilled in the art.

The processor 102 can be coupled to a printer 120 for printing output data on paper, as well as being coupled to a display 122, for instance, a monitor, such as an LCD (Liquid Crystal Display) screen, or any other type of display known to persons skilled in the art. The processor 102 can also be coupled to a loudspeaker 124. Furthermore, the processor 102 can be coupled to a communications network 126, for example, a Public Switched Telephone Network (PSTN), a Local Area Network (LAN), a Wide Area Network (WAN), and/or the Internet by means of a data communications interface 128. The processor 102 can therefore be arranged to communicate with other communication-enabled equipment through the network 126.

The data carrier 118 can comprise a computer program product in the form of data and/or instructions arranged to provide the processor 102 with the capacity to perform a method as described later herein. However, such a computer program product may, alternatively, be downloaded via the communications network 126.

The processing resource 102 can be implemented as a stand alone system, or as a plurality of parallel operating processors each arranged to carry out sub-tasks of a larger computer program, or as one or more main processors with several sub-processors.

Furthermore, parts of the functionality described herein can even be carried out by remote processors communicating with processor 102 through the communications network 126.

The components contained in the computing arrangement 100 of FIG. 1 are those typically found in general purpose computer systems, and are intended to represent a broad category of such computer components that are well known in the art. Thus, the computing arrangement 100 of FIG. 1 can be a Personal Computer (PC), workstation, minicomputer, mainframe computer, etc. The computer can also include different bus configurations, networked platforms, multi-processor platforms, etc. Various operating systems can be used including UNIX, Solaris, Linux, Windows, Macintosh OS, or any other suitable operating system.

Figure 2:
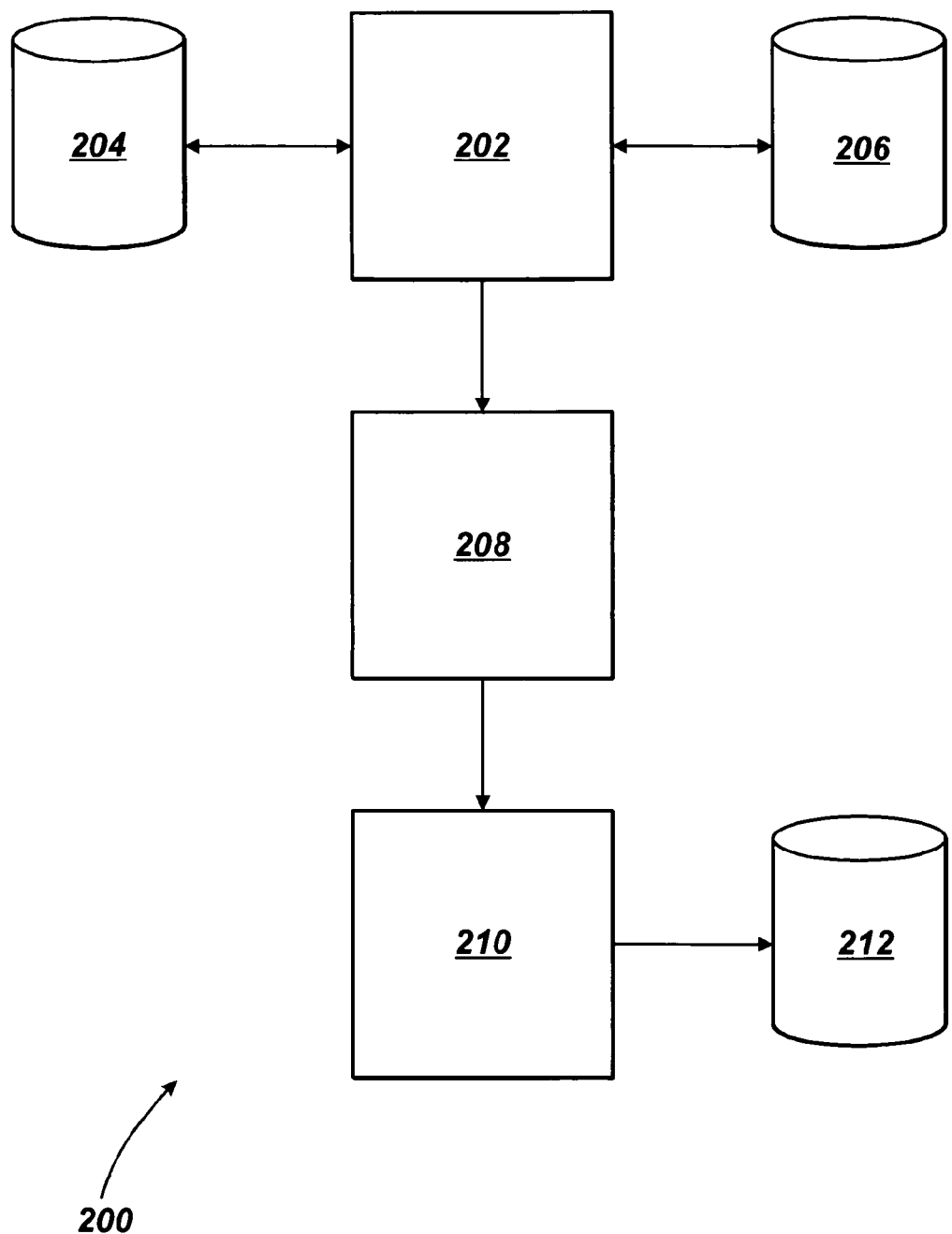
FIG. 2 is a schematic diagram of a location point determination module interfacing with data structures and supported by the computing arrangement of FIG. 1.

Turning to FIG. 2, the processing resource 102 supports a number of functional modules. In this respect, the processing resource 102 supports a location point determination module 200 that, in cooperation with the processing resource 102 constitutes a location point determination apparatus. The location point determination module 200 comprises a geographic feature harvesting module 202 capable of accessing a master digital map database 204 and a repository, for example a database, of named area data 206. In this example, the master digital map database 204 and the repository of named area data 206 are stored on the hard drive 104. However, one or both of the master digital map database 204 and the repository of named areas 206 can be located remotely from the computing arrangement 100 and accessible via, for example, the communications network 126. The location point determining module 200 also comprises a data assessment module 208 and a selection module 210. The data assessment module 208 is capable of communicating with the geographic feature harvesting module 202 and the selection module 210. The selection module 210 is capable of creating and/or accessing an export database 212. Again, the export database 212 can be stored on the hard drive 104 or remotely from the computing arrangement 100 in a like manner to the master digital map database 204 and/or the repository of named areas 206.

In this example, the master digital map database 204 includes data structures representing roads and their interconnections. Features of road segments have attributes that indicate a number of named places, sometimes more than one. For example, a postal code can be an attribute, the postal code defining a preferred postal name for the geographic feature, as well as any number of other additional permissible names. Additionally or alternatively, an attribute of road segments can be an administrative place code. An administrative place code defines an incorporated place name. A plurality of administrative locality names can be attributed from administrative sources, for example the so-called Topologically Integrated Geographic Encoding Referencing (TIGER) system in the US or StatsCan in respect of Canada. The data structures stored in the master digital map database 204 that relate to road segments can also include attributes of road segments that indicate a feature class or prominence of the road segment. Consequently, a road segment that is an interstate highway segment can be distinguished from a road segment that is a residential road.

In operation (FIG. 3), using the computing arrangement 100, an operator can generate a map product by using the location point determination apparatus as provided by the computing arrangement 100 supporting the location point determination module 200. In this regard, upon execution of the location point determination module 200, the geographic feature harvesting module 202 interrogates the user, for example a Digital Map Technician (DMT), to identify the repository of named areas 206, for example a location of a file on the hard disk drive 104 or a server (not shown) on a network. In this example, the geographic feature harvesting module 202 also interrogates the DMT to identify the master digital map database 204, for example another location of another file on the hard disk drive 104 or the server on the network. In this example, the master digital map database 204 comprises a geospatial dataset. The geospatial dataset contains digital representations of geometric or geographic objects and associated attribution, constituting geographic feature information. Examples of such geometric or geographic objects and associated attributions include a street centreline vector that is represented by geographic coordinates of points that lie on the street centreline and attributes, for example the speed limit for this length of the street and/or the name or names of the street and the ranges of addresses that occur along the street. Another example of the geometric or geographic objects and associated attributions is an outline of a congressional district in the USA where the associated geographic feature information consists of geographic coordinates along a boundary that can be connected to make a representation of the boundary on a map, the attribution associated with the boundary being, for example, the name or number of the congressional district.

After receiving identification of the master digital map database 204 and the repository of named areas 206, the geographic feature harvesting module 202 accesses (Step 300) the repository of named areas 206 and retrieves (Step 302) a first named area datum identifying a first named area, for example "Greenwich Village" in New York City, USA. The geographic feature harvesting module 202 then accesses the master digital map database 204 and analyses (Step 304) an attribute or attributes stored as part of the geographic features stored and known to identify respective named areas associated with the geographic features. For information stored in the master digital map database 204 in respect of each geographical feature, the geographic feature harvesting module 202 extracts or identifies the geographic feature information or at least part thereof where the geographic feature information has an attribute that identifies the first named area retrieved from the repository of named areas 206. In this example, it is assumed that all geographic feature information available per geographic feature is retrieved in respect of geographic features selected, but as suggested above, it should be understood that only part of the geographic feature information can be retrieved per geographic feature, if desired, in respect of each geographic feature selected by the geographic feature harvesting module 202. The extraction or identification of the geographic feature information should be understood to constitute a way of "collecting" geographic feature information.

Additionally, the geographic feature harvesting module 202 also collects a list of all nodes, along with the number and a list of the road segments that extend from those nodes. Nodes are data structures representing the intersection of two or more road segments. Geometrically, a node is a single point with a latitude and longitude coordinate. Although not mandatory, in this example, the nodes are built into a spatial index for speedy retrieval during processing by the location point determination module 200.

It should, or course, be appreciated that the content of the geographic feature information retrieved from the master digital map database 204 depends upon the manner in which the geographic feature information is recorded. In this example, the geographic feature harvesting module 202 is trying to retrieve geographic feature information in respect of a specific type of geographic feature, namely nodes. It should therefore be understood that although geographic feature information is stored in relation to another type of geographic feature, namely road segments, the geographic feature information nevertheless also relates to the nodes. In this example, as will become clear later herein, the geographic feature information associated with road segments as well as nodes is required. However, it should be understood that, for the purposes of evaluation, the nodes are the focus of the evaluation because they constitute the type of geographic feature from, or in respect of which, a location point, for example coordinates, are to be obtained and so the nodes are considered analytically pertinent.

In this example, the nodes are of particular interest, because they have point coordinates associated therewith. However, as will be explained later herein, other types of geographic feature having point coordinates associated therewith can be used in addition or as an alternative to the nodes and/or point coordinates can be derived from geographic features that do not have a single point location associated therewith. It should also be noted that combinations of types of geographic features can also be used, for example the location of a point of interest, the centroid of a polygon, and/or nodes associated with a street. These are examples of points that have a name of interest associated with the geographic feature.

Once the geographic feature harvesting module 202 has identified and collected all geographic features identified from the master digital map database 204 that relate to the named area currently being searched, the geographic feature information collected is passed (Step 306) to, or is accessible by, the data assessment module 208 for further analysis as to suitability for being a location point to represent the named area currently being searched.

Referring to FIG. 4, the data assessment module 208 then analyses the geographical feature information associated with each geographical feature collected of an analytically pertinent type, for example nodes, in order to evaluate the geographical feature information associated with each geographical feature collected. In this respect, the data assessment module 208 selects (Step 310) first geographic feature information associated with a first geographic feature collected and analyses (Step 312) at least one attribute expressed in the geographic feature information associated with the first geographic feature collected and currently being analysed.

The at least one attribute of the geographic feature can be evaluated in a number of different ways. As suggested above, in this example, the geographic features collected are nodes. A first attribute of the nodes that is analysed is the valence of each node, namely the number of road segments intersecting in respect of each node. However, a second attribute to be analysed is the feature class attribute of the road segments, which indicate the types of roads to which the street segments refer, for example: interstate highway, major road, minor road, residential and/or driveway. Hence, at least one attribute of the geographic feature is evaluated.

Prior to use of the location point determination module 200, a hierarchy of preference is constructed for the nodes. The hierarchy of preference indicates which nodes are preferred as navigation destination points, taking into consideration, in this example the valence and feature class of street segments contributing to the nodes (or other features). For example, an intersection of major roads would be preferable as a location point for vehicle navigation over the intersection of a residential street and a driveway. However, a node at the intersection of two freeways or motorways typically would not be a desired destination point. Different hierarchies can be constructed for different applications, for example pedestrian applications vs. vehicle navigation applications. In addition, the application can be a combination of pedestrian and vehicle navigation generally referred to as multimodal navigation. Herein, reference to a vehicle can be to a motor vehicle travelling a road, but also to other vehicles both land based and seafaring, for example or a bicycle or a boat or a ship, and it is not intended to limit this term to the context of vehicle traffic on roads.

By analysing the feature class attribute of each road segment associated with the geographic feature being analysed, the data assessment module 208 is able to benchmark the node being evaluated against the hierarchy of preference and provide (Step 314) a score for the node. After the node has been evaluated by the data assessment module 208, the data assessment module 208 determines (Step 316) whether other collected geographic features remain for evaluation. In the present example, the above steps (Steps 310 to 316) relating to evaluation of the geographical feature information associated with the geographical features collected are repeated until all the geographical feature information associated with all the (analytically pertinent) geographic features collected has been evaluated. Thereafter, the geographic feature information collected and associated scores are passed to, or accessible by, the selection module 210 for selection (Step 318) of a most suitable geographic feature to represent the named area being searched.

Turning to FIG. 5, the selection module 210 therefore then analyses (Steps 320) the scores attributed to the geographic features collected by the data assessment module 208 and determines (Step 322) the highest score(s) and whether any of the geographic features collected have the same highest score. Hence, the selection is in accordance with predetermined criterion, for example valency and/or feature class, used to evaluate the geographic feature information.

If no tie-break situation exists, the selection module 210 simply obtains (Step 324) the location point information, for example longitude and latitude coordinates, from the geographic feature information already retrieved and in respect of the highest scoring geographic feature. The selection module 210 then temporarily stores an association between the named area datum and the location point of the winning geographic feature.

Figure 6:
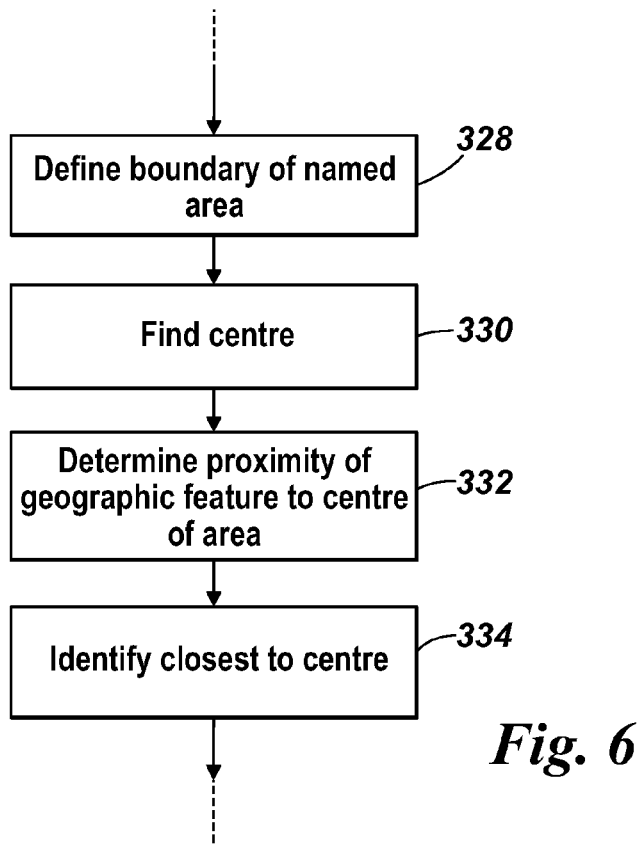
FIG. 6 is a flow diagram of a step of the part of the method of FIG. 5 in greater detail.
Figure 7:
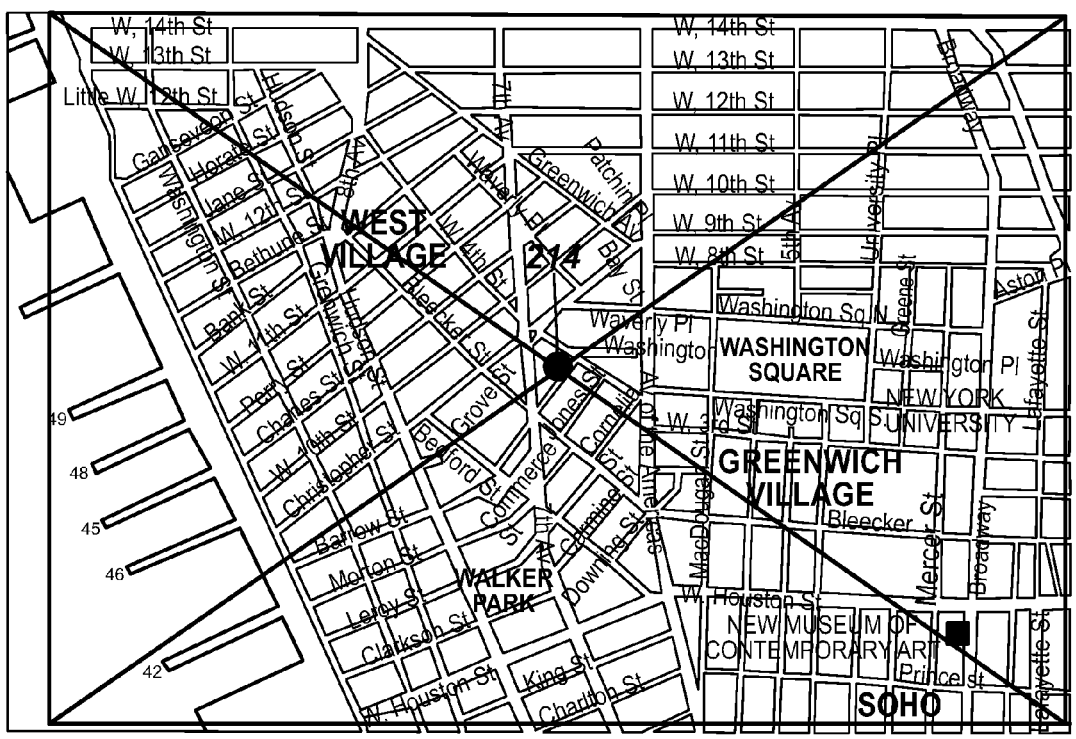
FIG. 7 is a schematic representation of map data and a calculated reference centre point calculated in accordance with the method of FIG. 3.

However, if two or more geographic features have identical scores as a result of the evaluation process described above, a reference centre calculator module (not shown) of the selection module 210 applies (Step 326) a tie-break criterion (FIG. 6). In this respect, the selection module 210 defines (Step 328) an area by a boundary, the boundary encompassing a number of or all road segments having respective attributes that identify the named area and so are associated with the named area. Hence, a bounding polygon is effectively defined by the extent of the road segments attributed with the locality, i.e. the named area, the boundary being formed from outermost road segments associated with the named area. The bounding polygon can be determined by computing a convex hull that encompasses all nodes contained within the included road segments. A maximum area is, in this example, therefore bounded. A reference centre point 214 (FIG. 7) for the area bounded by the bounding box, including other shaped areas, for the named area is then calculated (Step 330) by the reference centre calculator module. However, as the boundary box can have an irregular, for example non-square, shape the technique of calculating a centroid can produce a reference centre point outside the bounding box and hence the named area, and so a geographically weighted centre or centroid can be calculated, for example, using methods that assure a center point falls within a polygonal boundary. In this respect, a number of suitable known techniques for determining the reference centre point within the area exist, for example by determining an actual centroid, and determining if the actual centroid determined falls outside the polygonal boundary. A nearest point on the boundary with respect to the centroid is then calculated. A location of a weighted centroid can then be calculated along a line, subject to an optional predetermined buffer distance thereralong, which extends from the actual centroid and through the point on the nearest point on the boundary calculated. The buffered distance can be, for example, 20% of the distance along the line calculated above between the point nearest the centroid and a next point of intersection on the line with the polygonal boundary.

Figure 8:
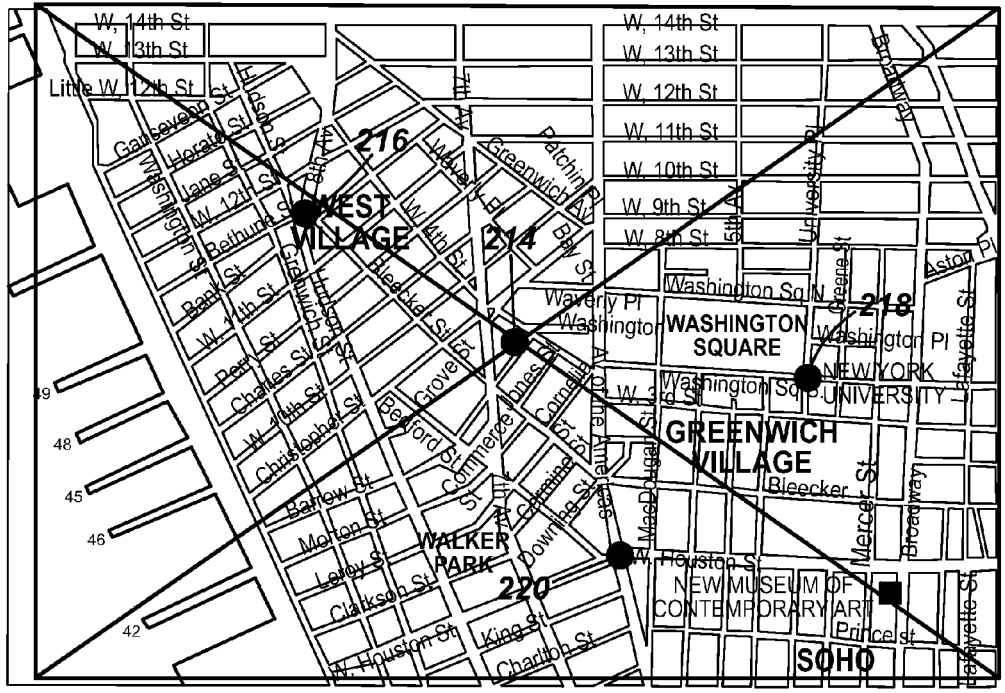
FIG. 8 is a schematic representation of map data, the calculated reference centre point of FIG. 7 and candidate geographic features for assessment in accordance with the steps of FIG. 6.

Referring to FIG. 8, once the reference centre point has been calculated, the location of each geographic feature having the same high score 216, 218, 220 (three points are assumed to have the same score in this example) is assessed with respect to the location of the reference centre point 214 in order to determine (Step 332) the proximity of each of the geographic features 216, 218, 220 being considered with respect to the reference centre point 214. In this regard, the proximity can be calculated according to any suitable technique known in the art, for example straight-line distance, driving distance, walking distance, walking time and/or driving time. The exact mode of calculation employed can depend upon the application or use of the named areas in the map product. For example, where the map product is primarily intended for motorists, the mode of determining the proximity can be based upon straight-line distance, driving distance and/or driving time criterion, whereas if the map product is primarily intended for pedestrian use, the walking distance, walking time and/or straight line distance criterion can be employed. For some applications, the use of the spatial index described above can facilitate determination of proximity.

As an alternative to determining proximity between equally scoring geographic features 216, 218, 220 and the reference centre point 214, a random selection of one of the geographic features 216, 218, 220 from the equally scoring geographic features can be performed by the selection module 210.

However, in this example, the closest geographic feature is identified (Step 334) by the selection module 210 using the proximities calculated and the selection module 210 then, referring back to FIG. 5, obtains (Step 324) the location point information, for example longitude and latitude coordinates, from the geographic feature information already retrieved and in respect of the geographic feature determined to be most proximal to the reference centre point 214. The selection module 210 then temporarily stores an association between the named area datum and the location point of the most proximal geographic feature.

Of course, where a dual use for the map product is intended, different modes of calculation of the proximity can be performed, for example, for driving and walking applications, and different locations of prevailing geographic features recorded for representing the named area depending upon application.

As an alternative technique, a combination of manual and automated processes can be employed. For example, a manually placed "seed" locations can be used instead of a calculated reference centre point, for example a centroid or adjusted centroid. In this respect, the above technique can be modified to identify a geographic feature relative to the manually placed seed location that is most appropriate to identify the named area. The criterion for selecting the geographic feature, for example an intersection, can be as described above, such as proximity.

Figure 3:
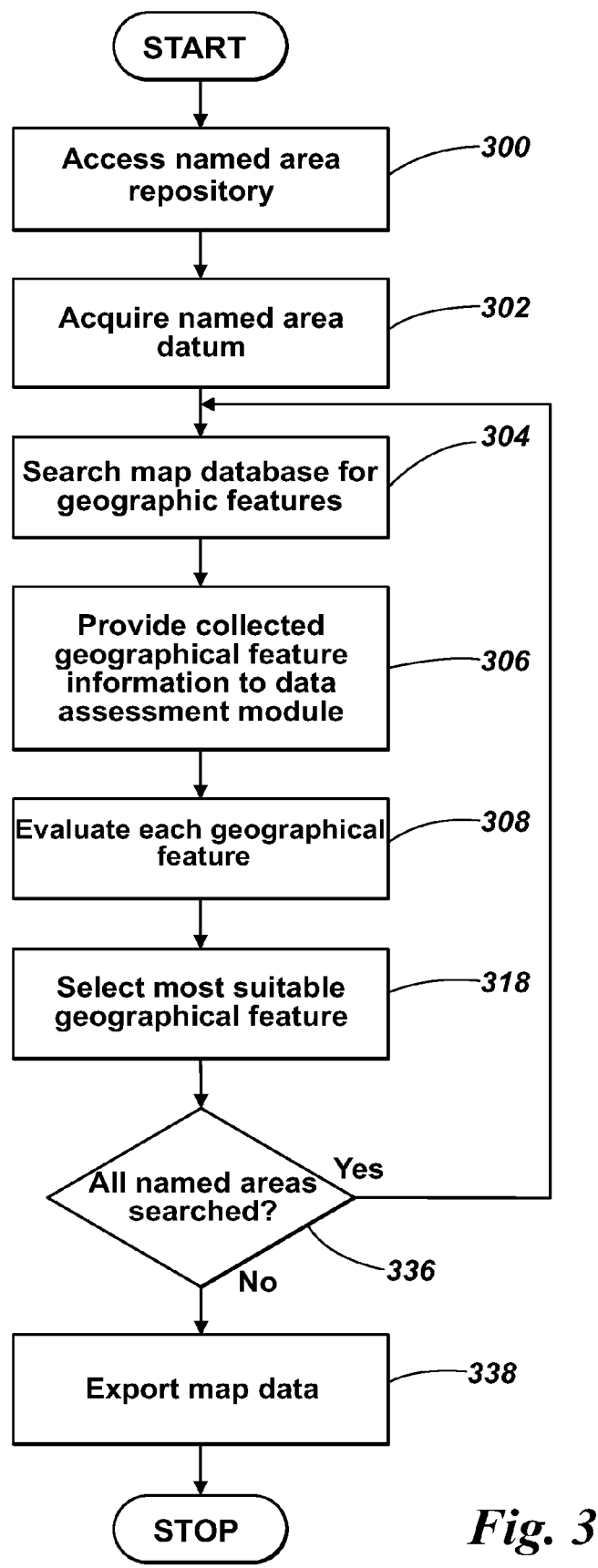
FIG. 3 is a flow diagram of a method of determining a location point for a named area constituting another embodiment of the invention.

After selection (Step 324) of the location point associated with the geographic feature to represent the named area, the selection module 210 passes control back to the geographic feature harvesting module 202, which determines (FIG. 3; Step 336) whether the repository of named areas 206 contains any more, unprocessed, named areas. In the event that further named area data remains to be processed, the above steps (Steps 300 to 336) are repeated in respect of each remaining named area datum in the repository of named areas 206.

Once processing of the named areas retrieved from the repository of named areas 206 has been completed, the geographic harvesting module 202 passes control back to the selection module 210 and the selection module 210 exports (Step 338) the named areas and associated location points to the export map database 212 to serve, at least in part, as a map product. The associated location points in the export map database 212 are then available to be used, for example, to place annotation on a map at the location points, for example as text indicating the name of the named area. In addition, the location point is available for such uses as geocoding and navigation where the user desires to be directed or to identify a location associated with the named area.

Whilst the above examples have been described in the context of a stand-alone process for respectively associating location points with named areas, the skilled person should appreciate that this process can, in another embodiment, be part of a map product generation process executed by a map generation system that obtains geospatial data from the master digital map database 204 and compiles a map product, for example using a map export module, that performs other known processing of geospatial data to yield the map product, the map product including in this embodiment a number of named areas respectively associated with location of geographic features identified by the selection module 210.

Also, whilst the above examples have been described in the context of the geographic features being nodes, the skilled person should appreciate that, additionally or alternatively, other geographic features within each named area can be used. For example, the geographic feature can be a landmark (referenced by, for example, a name attribute), a point of interest, and points for any other named areas, for example point locations in respect of polygonal features, such as landmarks, postal codes, and/or other types of features for which the concept of a "point location" is appropriate, such as an entry point for a park or neighbourhood. In this respect, the evaluation of the geographic feature information can vary depending upon application of the location point, for example driving or pedestrian. For example, a landmark such as a public transport depot can be preferable to valency for pedestrian applications. Furthermore, as suggested above, the geographic features do not have to be location points associated with nodes and can be the location of a prominent or important landmark located at a street address, which could be interpolated from a road segment containing the address of the geographic feature. Indeed, other attributes of road features or other geographic features can be used when choosing navigation destinations, for example: street names could be searched for "Main Street" or landmark names searched for "City Hall" or "post office". In some circumstances, and depending upon application, the geographic feature to be evaluated is not a point but a line, area or region, for example a city green or park. In order to provide a point, the point can be derived from the geographic feature, for example if the geographic feature ultimately selected by the selection module 210 is a section of a road, a midpoint or an end of the section of road can be selected. In the case of the non-linear geographic feature, for example the city park, an entrance or exit associated with the geographic feature can be selected to make the location point of more useful to, for example the user, such as a pedestrian.

Although not described in the above examples, the measurement of proximity of a geographic feature from a reference centre point can be used by the data assessment module 208 in order to score or contribute to scoring the geographic references. The proximity can then, if required, be traded off against other metrics, for example valency.

In the above examples, the determination of the location points for respective named areas is intended for the location points to constitute navigation destinations in the exported map product. However, the skilled person should appreciate that the determination of location points need not exclusively be used to serve as navigation destinations or used at all as navigation destinations. In this regard, the location points can be used in respect of icons to represent the named areas on a map display.

In another embodiment, the point location determination module 200 can be incorporated into a PND for use on an ad-hoc basis for individually user-identified named areas. Embodiments of the present invention will therefore now be described with particular reference to the PND as opposed to the computer arrangement 100, although the PND can be perceived as a type of computing arrangement. It should be remembered, however, that the teachings herein are not limited to PNDs but are instead universally applicable to any type of processing device that is configured to execute navigation software in a portable and/or mobile manner so as to provide route planning and navigation functionality. It follows therefore that in the context of the embodiments set forth herein, a navigation apparatus is intended to include (without limitation) any type of route planning and navigation apparatus, irrespective of whether that device is embodied as a PND, a vehicle such as an automobile, or indeed a portable computing resource, for example a portable personal computer (PC), a mobile telephone or a Personal Digital Assistant (PDA) executing route planning and navigation software.

It should be appreciated that, in some circumstances, the "destination" location selected by a user need not have a corresponding start location from which the user wishes to start navigating, and as a consequence references hereinafter to the "destination" location or indeed to a "destination" view should not be interpreted to mean that the generation of an initial route is essential, that travelling to the "destination" must occur, or indeed that the presence of a destination requires the designation of a corresponding start location.

Figure 9:
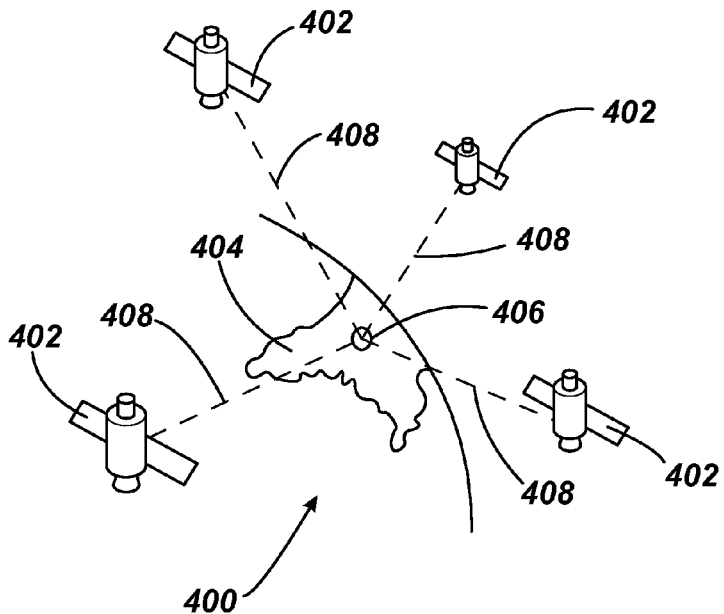
FIG. 9 is a schematic illustration of an exemplary part of a Global Positioning System (GPS) usable by a navigation apparatus.

With the above provisos in mind, the Global Positioning System (GPS) of FIG. 9 and the like are used for a variety of purposes. In general, the GPS is a satellite-radio based navigation system capable of determining continuous position, velocity, time, and in some instances direction information for an unlimited number of users. Formerly known as NAVSTAR, the GPS incorporates a plurality of satellites which orbit the earth in extremely precise orbits. Based on these precise orbits, GPS satellites can relay their location to any number of receiving units.

The GPS system is implemented when a device, specially equipped to receive GPS data, begins scanning radio frequencies for GPS satellite signals. Upon receiving a radio signal from a GPS satellite, the device determines the precise location of that satellite via one of a plurality of different conventional methods. The device will continue scanning, in most instances, for signals until it has acquired at least three different satellite signals (noting that position is not normally, but can be determined, with only two signals using other triangulation techniques). Implementing geometric triangulation, the receiver utilizes the three known positions to determine its own two-dimensional position relative to the satellites. This can be done in a known manner. Additionally, acquiring a fourth satellite signal allows the receiving device to calculate its three dimensional position by the same geometrical calculation in a known manner. The position and velocity data can be updated in real time on a continuous basis by an unlimited number of users.

As shown in FIG. 9, the GPS system 400 comprises a plurality of satellites 402 orbiting the earth 404. A GPS receiver 406 receives spread spectrum GPS satellite data signals 408 from a number of the plurality of satellites 402. The spread spectrum data signals 408 are continuously transmitted from each satellite 402, the spread spectrum data signals 408 transmitted each comprise a data stream including information identifying a particular satellite 402 from which the data stream originates. The GPS receiver 406 generally requires spread spectrum data signals 408 from at least three satellites 402 in order to be able to calculate a two-dimensional position. Receipt of a fourth spread spectrum data signal enables the GPS receiver 406 to calculate, using a known technique, a three-dimensional position.

In this example, a navigation apparatus 500 (not shown in FIG. 9) comprising or coupled to the GPS receiver device 406, is capable of establishing a data session, if required, with network hardware of a communications network, for example a "mobile" communications network via a wireless communications terminal (not shown), such as a mobile telephone, PDA, and/or any device equipped with mobile telephone technology, in order to establish a digital connection, for example a digital connection via known Bluetooth technology. Thereafter, through its network service provider, the mobile terminal can establish a network connection (through the Internet for example) with a server (not shown) if required. As such, a "mobile" network connection can be established between the navigation apparatus 500 (which can be, and often times is, mobile as it travels alone and/or in a vehicle) and the server.

In this example, the navigation apparatus 500 is a Bluetooth enabled navigation apparatus in order that the navigation apparatus 500 can be agnostic to the settings of the wireless communications terminal, thereby enabling the navigation apparatus 500 to operate correctly with the ever changing spectrum of mobile telephone models, manufacturers, etc. Model/manufacturer specific settings may, for example, be stored on the navigation apparatus 500.

Although not shown, instead of requiring the wireless communications terminal to provide access to the communications network, the navigation apparatus 500 can, of course, comprise mobile telephone hardware, including an antenna, for example, or optionally using an internal antenna of the navigation apparatus 500. The mobile telephone hardware within the navigation apparatus 500 can also include an insertable card (e.g. Subscriber Identity Module (SIM) card). As such, mobile telephone technology within the navigation apparatus 500 can similarly establish a network connection between the navigation apparatus 500 and the server, via the Internet for example, in a manner similar to that of any wireless communications-enabled terminal.

The establishing of the network connection between the mobile device (via a service provider) and another device such as the server, using the Internet for example, can be done in a known manner. In this respect, any number of appropriate data communications protocols can be employed, for example the TCP/IP layered protocol. Furthermore, the mobile device can utilize any number of communication standards such as CDMA2000, GSM, IEEE 802.11a/b/c/g/n, etc.

Hence, it can be seen that the Internet connection can be utilised, which can be achieved via a data connection using the mobile telephone or mobile telephone technology.

As mentioned above, the navigation apparatus 500 can be arranged to communicate with the server through a communications channel (not shown), using a transmitter and a receiver (both also not shown) to send and receive signals and/or data through the communications channel, noting that these devices can further be used to communicate with devices other than the server, for example other servers (not shown). Further, the transmitter and receiver constitute a communications unit and are selected or designed according to communication requirements and communication technology used in the communication design for the navigation apparatus 500 and the functions of the transmitter and receiver can be combined into a single transceiver. Of course, the navigation apparatus 500 comprises other hardware and/or functional parts, which will now be described in further detail hereinbelow.

Figure 10:
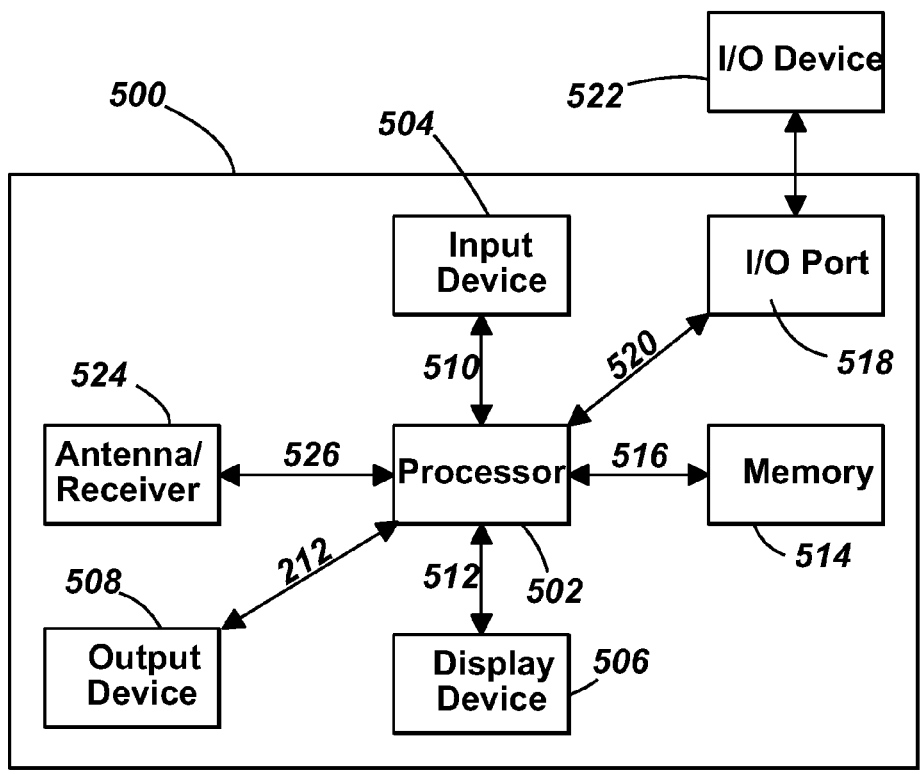
FIG. 10 is a schematic illustration of electronic components of a navigation apparatus.

Referring to FIG. 10, it should be noted that the block diagram of the navigation apparatus 500 is not inclusive of all components of the navigation apparatus 500, but is only representative of many example components. The navigation apparatus 500 is located within a housing (not shown). The navigation apparatus 500 includes a processing resource comprising, for example the processor 502, the processor 502 being coupled to an input device 504 and a display device, for example a display screen 506. Although reference is made here to the input device 504 in the singular, the skilled person should appreciate that the input device 504 represents any number of input devices, including a keyboard device, voice input device, touch panel and/or any other known input device utilised to input information. Likewise, the display screen 506 can include any type of display screen, for example a Liquid Crystal Display (LCD).

In one arrangement, one aspect of the input device 504, the touch panel, and the display screen 506 are integrated so as to provide an integrated input and display device, including a touchpad or touchscreen user interface input, to enable both input of information (via direct input, menu selection, etc.) and display of information through the touch panel screen so that a user need only touch a portion of the display screen 506 to select one of a plurality of display choices or to activate one of a plurality of virtual or "soft" buttons. In this respect, the processor 502 supports a Graphical User Interface (GUI) that operates in conjunction with the touchscreen.

In the navigation apparatus 500, the processor 502 is operatively coupled to and capable of receiving input information from input device 504 via a connection 510, and operatively coupled to at least one of the display screen 506 and an output device 508, via respective output connections 512, to output information thereto. The output device 508 is, for example, an audible output device (e.g. a loudspeaker). As the output device 508 can produce audible information for a user of the navigation apparatus 500, it is should equally be understood that input device 504 can include a microphone and software for receiving input voice commands as well. Further, the navigation apparatus 500 can also include any additional input device and/or any additional output device, for example audio input/output devices. The processor 502 is operably coupled to a memory resource 514 via connection 516 and is further adapted to receive/send information from/to input/output (I/O) ports 518 via connection 520, wherein the I/O port 518 is connectible to an I/O device 522 external to the navigation apparatus 500. The memory resource 514 comprises, for example, a volatile memory, such as a Random Access Memory (RAM) and a non-volatile memory, for example a digital memory, such as a flash memory. The external I/O device 522 can include, but is not limited to an external listening device, such as an earpiece for example. The connection to I/O device 522 can further be a wired or wireless connection to any other external device, for example a car stereo unit for hands-free operation and/or for voice activated operation, for connection to an earpiece or headphones, and/or for connection to a mobile telephone, wherein the mobile telephone connection can be used to establish the data connection between the navigation apparatus 500 and the server via the Internet or any other network for example.

FIG. 10 further illustrates an operative connection between the processor 502 and an antenna/receiver 524 via connection 526, wherein the antenna/receiver 524 can be a GPS antenna/receiver, for example, as mentioned above in relation to FIG. 9. It should be understood that the antenna and receiver designated by reference numeral 524 are combined schematically for illustration, but that the antenna and receiver may be separately located components, and that the antenna may be a GPS patch antenna or helical antenna for example.

It will, of course, be understood by one of ordinary skill in the art that the electronic components shown in FIG. 10 are powered by one or more power sources (not shown) in a conventional manner. As will be understood by one of ordinary skill in the art, different configurations of the components shown in FIG. 10 are contemplated. For example, the components shown in FIG. 10 can be in communication with one another via wired and/or wireless connections and the like. Thus, the navigation apparatus 500 described herein can be a portable or handheld navigation device 500.

Figure 11:
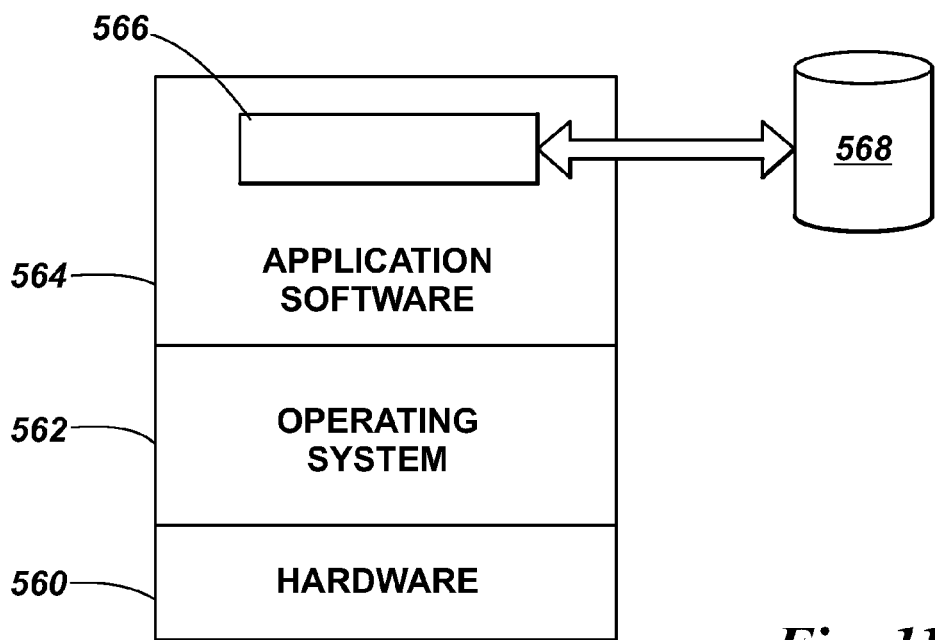
FIG. 11 is a schematic representation of an architectural stack employed by the navigation apparatus of FIG. 10.

Turning to FIG. 11, the memory resource 514 stores a boot loader program (not shown) that is executed by the processor 502 in order to load an operating system 562 from the memory resource 514 for execution by functional hardware components 560, which provides an environment in which application software 564 can run. The application software 564 provides an operational environment including the GUI that supports core functions of the navigation apparatus 500, for example map viewing, route planning, navigation functions and any other functions associated therewith. In this respect, part of the application software 564 comprises a location point determination module 566. A location point determination apparatus is thereby provided.

The location point determination module 566 is of a like architecture to that described above in relation to FIG. 2. However, instead of the geographic feature harvesting module 202 being capable of accessing the repository of named areas 206 to acquire the named area datum, the named area datum is provided via the input interface of the navigation apparatus 500 as will be described in further detail later herein. Instead of the provision of the master digital map database 204, the geographic feature information is stored in a digital map database 568 either as provided by a digital map supplier or a map product that has been further processed and/or compiled for use by the navigation apparatus 500. In this example, the map database 568 is stored by the digital memory that is part of the memory resource 514.

Operation of the above navigation apparatus 500 will now be described in the context of a user of the navigation apparatus 500 wishing to travel between two locations in the USA. However, the skilled person should appreciate that other equally applicable examples are conceivable and the choice of locations is not intended to be limiting.

Figure 12:
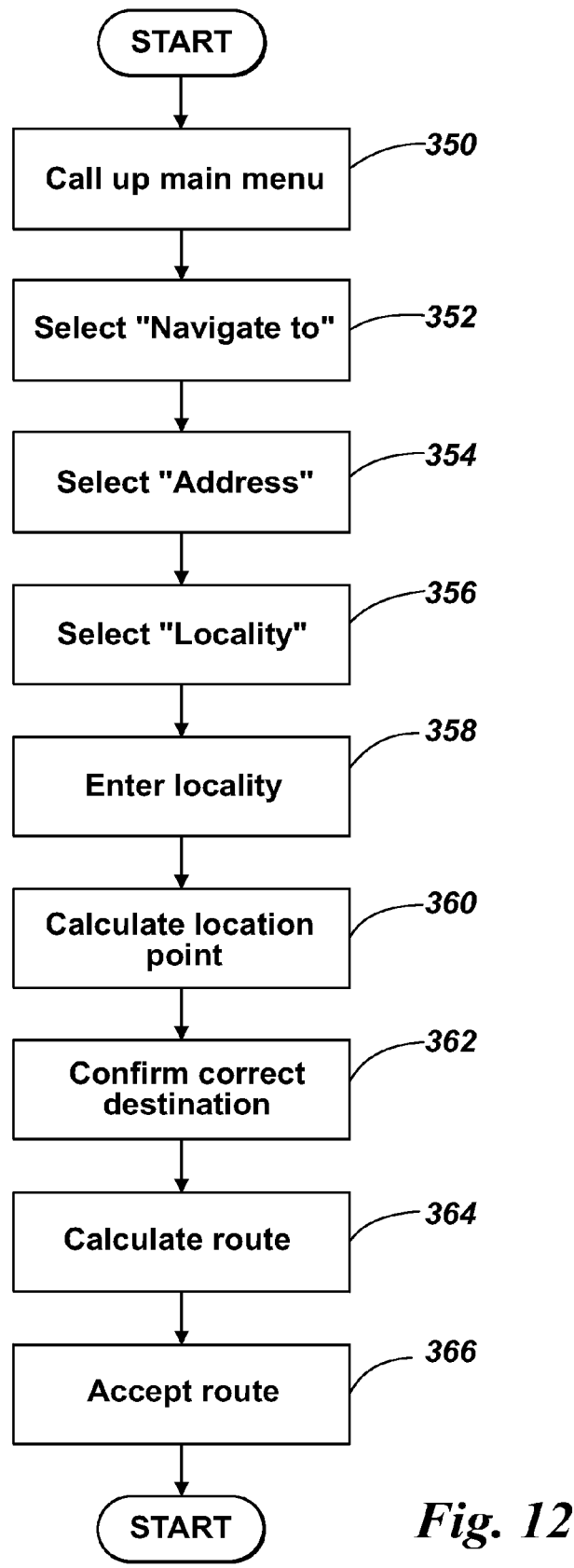
FIG. 12 is flow diagram of a method of navigating using the module of FIG. 2.

In operation (FIG. 12), the user, located at Central Park in Manhattan, N.Y., requires navigation assistance to Greenwich Village, N.Y. In this example, Greenwich Village is the named area.

In order to implement navigation to the named area using the navigation apparatus 500, the user configures a route as follows. Referring also to FIGS. 13 to 21, the user undertakes an illustrative destination location input and selection process described hereinbelow. Although not shown, the user uses a settings menu option supported by the application software 564 in order to select view generation in a three-dimensional mode.

Figure 13:
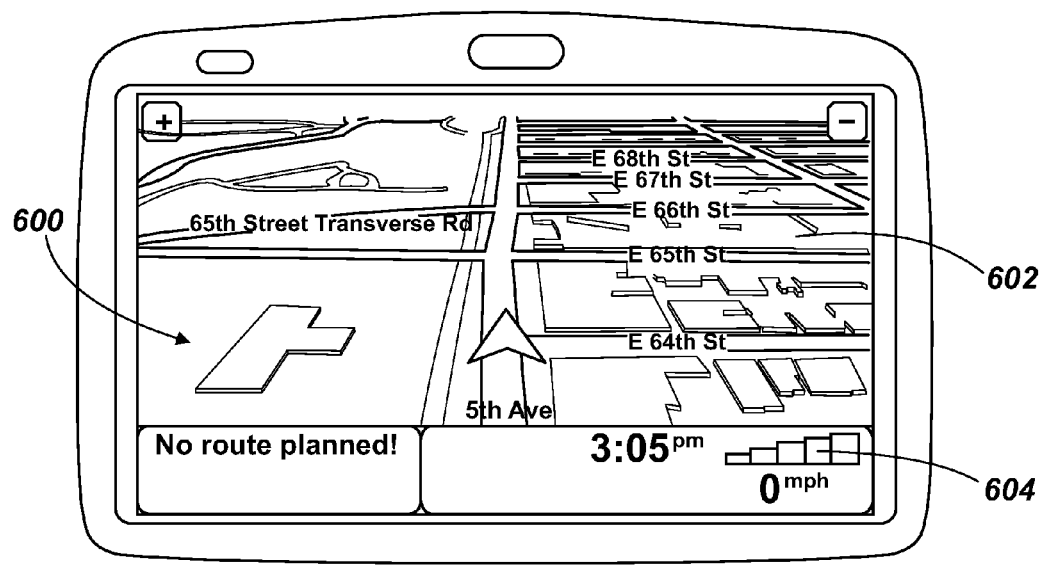
FIGS. 13 to 21 are screen shots from the navigation apparatus during performance of the method of FIG. 12.

When a user powers up the navigation apparatus 500, the apparatus 500 acquires a GPS fix and performs a self-location determination by calculating (in a known manner) the current location of the navigation apparatus 500. The user is then presented, as shown in FIG. 13, with a display 600 showing in pseudo three-dimensions: a local environment 602 in which the navigation apparatus 500 is determined to be located and, in a region 604 of the display 600 below the local environment 602, a set of control and status messages.

Figure 14:
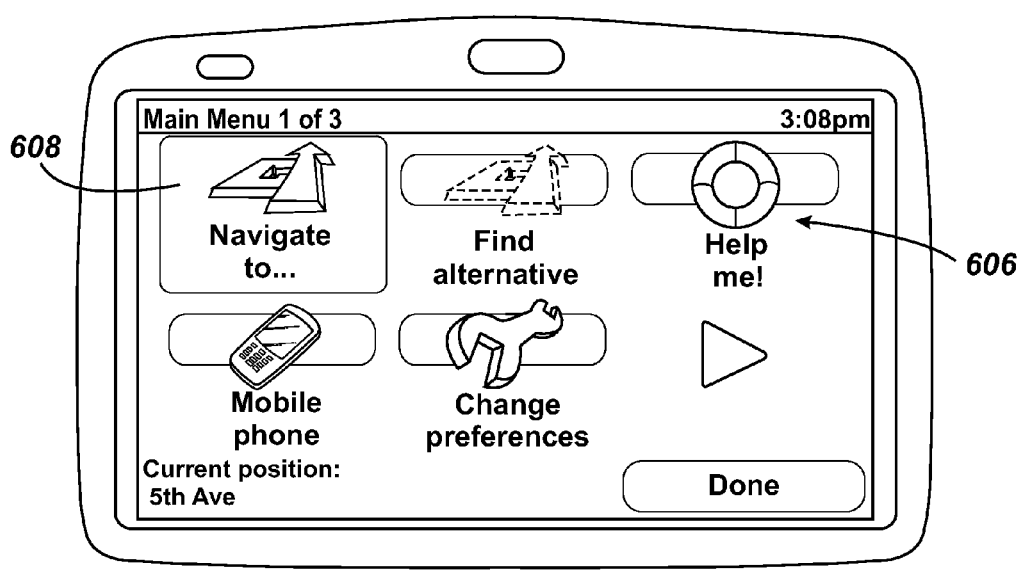

By touching (Step 350) the display at the local environment 602, the navigation apparatus 500 updates the display 600 by displaying (as shown in FIG. 14) a series of virtual or soft buttons 606 by means of which the user can, inter alia, input a destination to which the user wishes to navigate.

Figure 15:
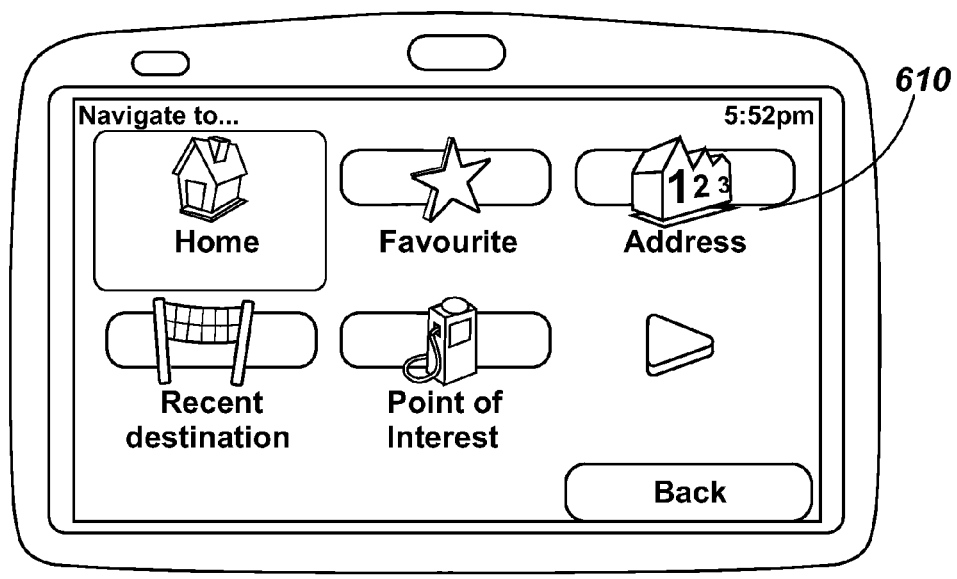

By touching (Step 352) the "Navigate to" virtual button 608, the navigation apparatus 500 switches to display (as shown in FIG. 15) a plurality of virtual buttons as part of a destination selection interface that are each associated with a different category of selectable destinations. In this instance, the display 600 shows a "Home" virtual button that if pressed would set the destination to a stored home location. A "Favourite" virtual button, if pressed, reveals a list of destinations that the user has previously stored in the navigation apparatus 500 and if one of these destinations is then selected the destination for the route to be calculated is set to the selected previously stored destination. An "Address" virtual button 610 commences a process by which the user can input the street address of the destination or a locality to which the user wishes to navigate. A "Recent destination" soft button, if pressed, reveals a list of selectable destinations held in the memory of the navigation apparatus 500 and to which the user has recently navigated. Selection of one of the destinations populating this list would set the destination location for the route to the selected (previously visited) location. A triangular "arrow" shaped virtual button provides access to additional sub-menu options relating to the "Navigate to . . . " menu option.

Figure 16:
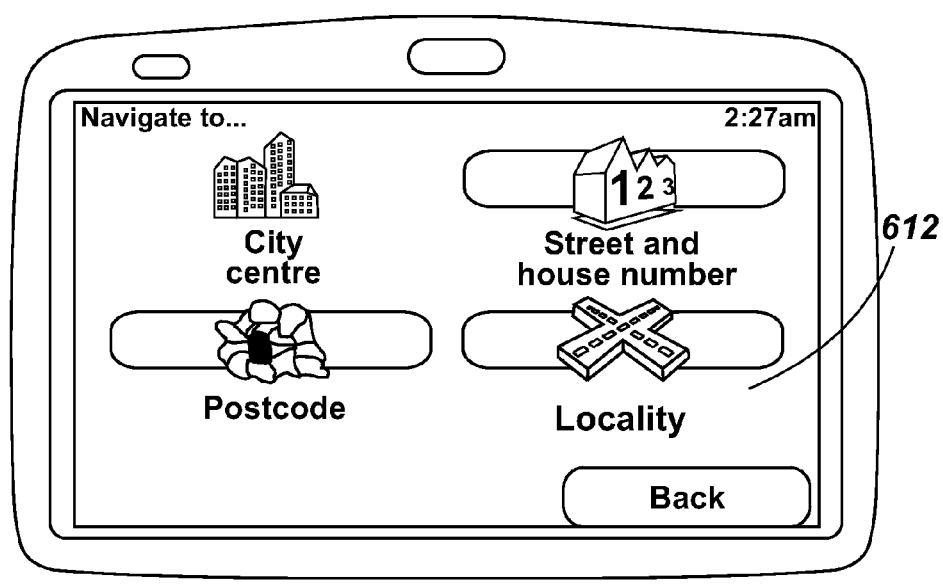

Since the user, in this example, knows the name of the locality to which the user wishes the navigation apparatus 500 to calculate a route, it is assumed that the "Address" virtual button 610 is operated (Step 354) by touching the button as displayed on the touchscreen, whereupon (as shown in FIG. 16) the navigation apparatus 500 updates the display 600 to show a number of options by means of which a user can opt to navigate to any of a plurality of locations, such as a "City Centre", a "Street and house number", a "Postcode", or a "Locality". The user therefore touches (Step 356) a "Locality" virtual button 612.

Figure 17:
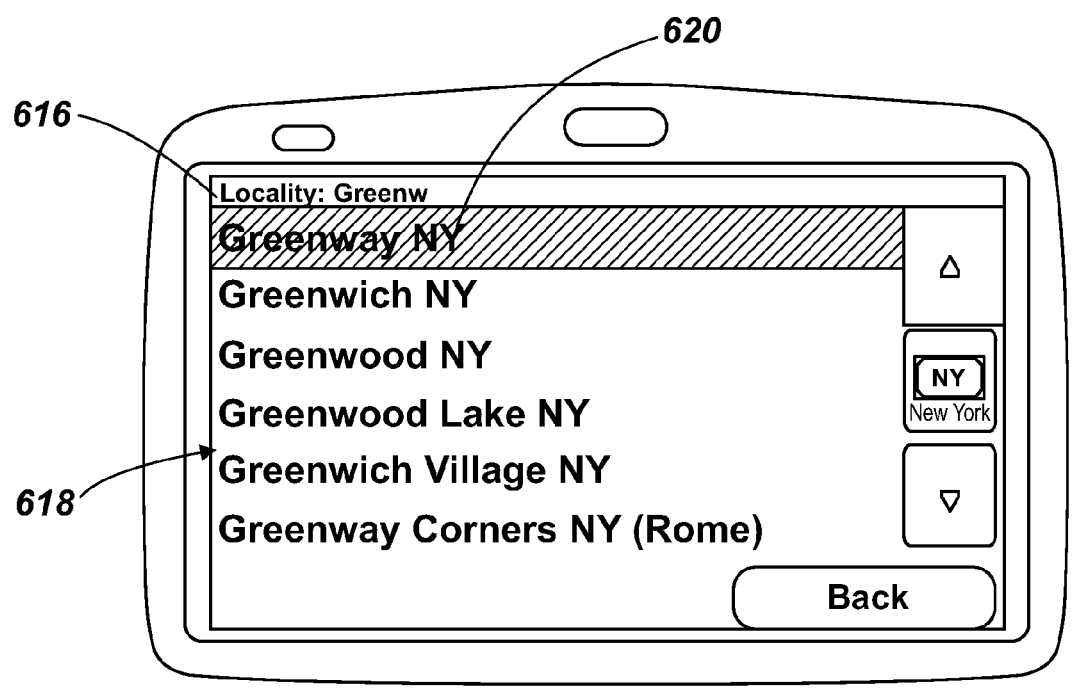

The navigation apparatus 500 then updates the display 600 (as shown in FIG. 17) in order to show a virtual keypad 614 and prompts the user, by means of a prompt 616, to enter (Step 358) the name of the locality sought by the user.

The user therefore begins to type the named area, for example Greenwich Village, using the virtual keypad (not shown) until the name "Greenwich Village" appears in a results space 618 located below the prompt 616. In this example, the user wishes to visit Greenwich Village and the results space 618 contains a results entry 620 entitled "Greenwich Village". As this is the locality sought by the user, the user selects the locality by touching the results entry 620.

Figure 18:
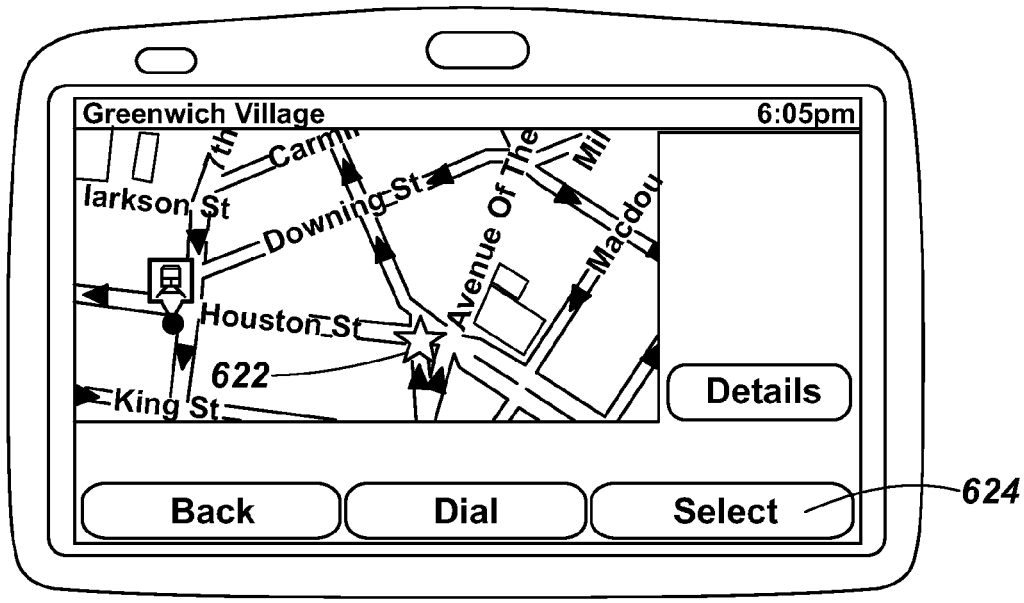

The selected locality is then provided to the location point determination module 566, the named area provided constituting the named area datum. The location point determination module 566 then uses the named area datum to harvest the digital map database of the navigation apparatus 600 and determines (Step 360) a point location that represents the named area in accordance with any of the manners described above in relation to the generation of enriched map data, except that only a single named area is processed. Once the location point has been determined by the location point determination module 566, the location point is passed to the navigation apparatus 500 as a navigation destination and the navigation apparatus 500 updates the display 600 (as shown in FIG. 18) in order to show a location 622 constituting the destination point representing the named area relative to neighbouring streets. The display 600 also shows a "Back" virtual button, a "Dial" virtual button for where telephone integration support is provided and a "Select" virtual button 624.

As the user believes that the correct location has been found, the user confirms (Step 362) selection of the named area by touching the "Select" virtual button 624, whereupon the application software 564 of the navigation apparatus 500 calculates (Step 364) a route between the current location of the navigation apparatus 500 and the selected navigation destination. In this example, the processor 502 then calculates a journey time associated with the route calculated, the journey time being estimated. The estimation can involve use of traffic data and any other data available, for example road speed limit data.

Figure 19:
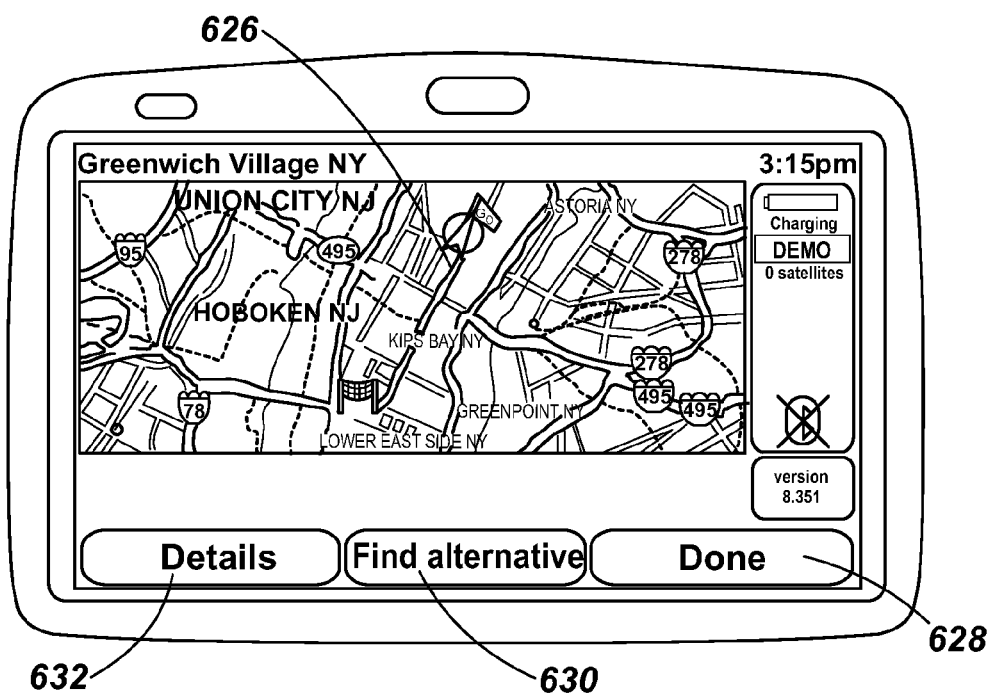
Figure 20:
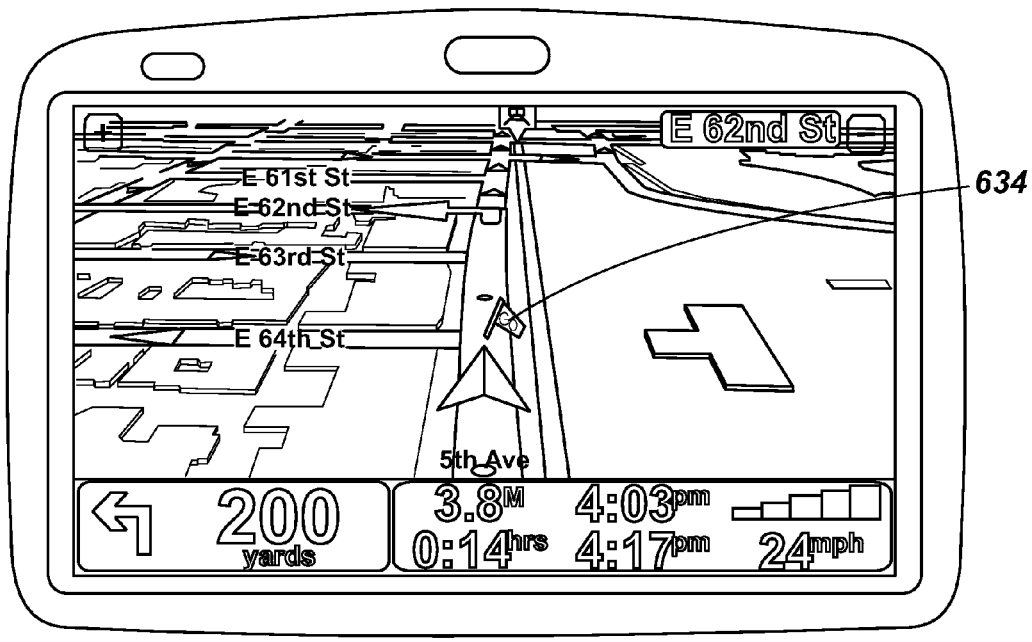

The navigation apparatus 500 then displays the calculated route 626, as shown in FIG. 19, on a relatively low magnification map that shows the entire route. The user is also presented with: another "Done" virtual button 628 that the user can press to indicate the calculated route is acceptable, a "Find alternative" button 630 that the user can press to cause the navigation apparatus 500 to calculate another route to the selected destination, and a "Details" button 632 that a user can press to reveal selectable options for the display of more detailed information concerning the currently displayed route 626.

In this instance, it is assumed that the user considers the displayed route acceptable, and once the "Done" virtual button 628 has been pressed, the user is presented with a three-dimensional view (FIG. 20) of the current, start, location 634 for the navigation apparatus 500.

Once the route has been set by the user, the user departs from the starting location and the navigation apparatus 500 guides the user, in a known manner, by updating the map in accordance with determined changes in location of the navigation apparatus 500, and by providing the user with visual and, optionally, audible navigation instructions. In this respect, the navigation apparatus 500, via the processor 502 and the GPS receiver 524 constituting a location determination unit, monitors the location of the navigation apparatus 500. Once the navigation apparatus 500 has progressed a sufficient distance along the route planned by the application software 564 of the navigation apparatus 500, it is necessary to update the three-dimensional view displayed by the display device 506. Using longitude and latitude data relating to the location of the navigation apparatus 500, the application software 564 accesses map data and retrieves terrain data, land use data and road data and renders a three-dimensional view using this information. As the details of rendering views is not central to the description of the embodiments herein, for the sake of clarity and conciseness of description further details of the rendering of views will not be described further.

Figure 21:
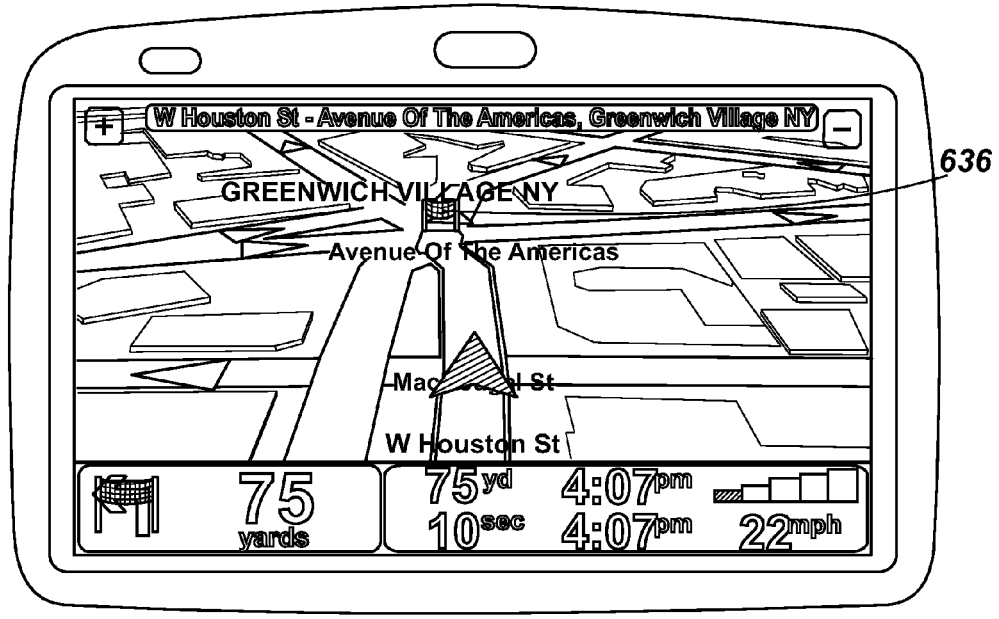

The navigation apparatus 500 continues to provide guidance to the user, and assuming the user follows the instructions provided by the navigation apparatus 500, the navigation apparatus 500 eventually identifies the location of the destination (in this instance: a location point representing Greenwich Village) by a chequered flag 636 (FIG. 21).

It will also be appreciated that whilst various aspects and embodiments of the present invention have heretofore been described, the scope of the present invention is not limited to the particular arrangements set out herein and instead extends to encompass all arrangements, and modifications and alterations thereto, which fall within the scope of the appended claims.

For example, although the above embodiments have largely been described in the context of a process for setting a destination, the above examples can be employed in relation to setting one or more destinations whilst en-route and following a route already calculated by the navigation apparatus.

Whilst embodiments described in the foregoing detailed description refer to GPS, it should be noted that the navigation apparatus may utilise any kind of position sensing technology as an alternative to (or indeed in addition to) GPS. For example the navigation apparatus may utilise using other global navigation satellite systems such as the European Galileo system. Equally, it is not limited to satellite based but could readily function using ground based beacons or any other kind of system that enables the device to determine its geographic location.

Alternative embodiments of the invention can be implemented as a computer program product for use with a computer system, the computer program product being, for example, a series of computer instructions stored on a tangible data recording medium, such as a diskette, CD-ROM, ROM, or fixed disk, or embodied in a computer data signal, the signal being transmitted over a tangible medium or a wireless medium, for example, microwave or infrared. The series of computer instructions can constitute all or part of the functionality described above, and can also be stored in any memory device, volatile or non-volatile, such as semiconductor, magnetic, optical or other memory device.

It will also be well understood by persons of ordinary skill in the art that whilst the preferred embodiment implements certain functionality by means of software, that functionality could equally be implemented solely in hardware (for example by means of one or more ASICs (application specific integrated circuit)) or indeed by a mix of hardware and software. As such, the scope of the present invention should not be interpreted as being limited only to being implemented in software.

Lastly, it should also be noted that whilst the accompanying claims set out particular combinations of features described herein, the scope of the present invention is not limited to the particular combinations hereafter claimed, but instead extends to encompass any combination of features or embodiments herein disclosed irrespective of whether or not that particular combination has been specifically enumerated in the accompanying claims at this time.

The invention claimed is:

1. An apparatus for associating a location point with a named area on a digital map, the apparatus comprising:
    a geographic feature harvesting module arranged to access a digital map database and collect, geographic feature information associated with a predetermined named area datum;
    a data assessment module arranged to receive the geographic feature information collected by the geographic feature harvesting module and to evaluate the geographic feature information collected in respect of at least one attribute of each geographic feature associated with the geographic feature information, wherein the data assessment module further calculates a geographic feature score; and
    a selection module arranged to select a geographic feature from the geographic features evaluated, the selection being in accordance with a predetermined criterion associated with the evaluation of the geographic feature information and an associated geographic feature score, wherein the selection module is configured to, when the selected geographic feature having a highest score does not have a geographic feature score equal to another geographic feature:
    obtain location point information from the geographic feature information of the selected geographic feature; and
    associate the named area datum with the obtained location point information; and
when the selected geographic feature having a highest score has a geographic feature score equal to another geographic feature:
    apply a tie-break criterion to the selected geographic feature and the another geographic feature;
    obtain location point information from the geographic feature information of the selected geographic feature winner of the tie-break; and
    associate the named area datum with the obtained location point information.

2. An apparatus as claimed in claim 1, wherein the geographic feature is selected from the group consisting of: a node and a landmark.

3. An apparatus as claimed in claim 1, wherein the geographic feature is located at a point along a road segment.

4. An apparatus as claimed in claim 1, wherein the geographic feature harvesting module is arranged to access a map database comprising the geographic feature information, the geographic feature information comprising respective attributes associated with the geographic feature.

5. An apparatus as claimed in claim 1, further comprising a reference centre calculator module arranged to determine a reference centre point with respect to the named area.

6. An apparatus as claimed in claim 5, wherein the reference centre calculator module is arranged to determine the reference centre point by calculating a centroid with respect to a boundary associated with the named area.

7. An apparatus as claimed in claim 6, wherein the boundary is determined by selecting geospatial objects associated with the named area that bound a maximum area.

8. An apparatus as claimed in claim 6, wherein the centroid is a weighted centroid.

9. An apparatus as claimed in claim 5, wherein the predetermined criterion used by the selection module is proximity of the geographic feature with respect to the reference centre point.

10. An apparatus as claimed in claim 9, wherein the proximity of the geographic feature with respect to the reference centre point is calculated using a mode of calculation based upon one of: a straight-line distance, a driving distance, a driving time, or a walking time.

11. An apparatus as claimed in claim 5, wherein the data assessment module also evaluates proximity of the each geographic feature with respect to the reference centre point.

12. An apparatus as claimed in claim 11, wherein the proximity of the geographic feature with respect to the reference centre point is calculated using a mode of calculation based upon one of: a straight-line distance, a driving distance, a driving time, or a walking time.

13. A map generation system comprising:
    a location point determination apparatus as claimed in claim 1;
    a digital map database; and
    a repository of a number of named areas; and
    a map export module arranged to generate a map product; wherein the location point determining apparatus is arranged to access the repository of named areas and provide in respect of each of the number of named areas a geographic feature selected by the selection module; and
    the map export module is arranged to generate the map product using the digital map database and location information associated with the geographic features selected in order to generate the map product having the number of named areas respectively identified as being at the locations of the geographic features selected.

14. A system as claimed in claim 13, wherein the map product stores a named area of the respectively identified number of named areas for expression in an annotation form.

15. The apparatus of claim 1, wherein the selection module temporarily stores an association between a named area datum and location point based on the geographic feature score.

16. The apparatus of claim 1, wherein the at least one attribute evaluated by the data assessment module is selected from the group consisting of a valence and a feature class.

17. The apparatus of claim 16 further comprising constructing a hierarchy of nodes based on preference.

18. The apparatus of claim 17, wherein the preference indicates preferred destination points.

19. The apparatus of claim 17, wherein the hierarchy is based on a multi-modal navigation.

20. A method of associating a location point with a named area on a digital map, the method comprising:
- accessing and collecting geographic feature information from a digital map database, the geographical feature information being associated with a predetermined named area datum;
- receiving the geographic feature information collected;
- evaluating from the geographic feature information collected in respect of at least one attribute of each geographic feature associated with the geographic feature information;
- calculating a geographic feature score for each geographic feature;
- selecting a geographic feature from the geographic features evaluated, the selection being in accordance with a predetermined criterion associated with the evaluation of the geographical feature information and an associated geographic feature score, wherein,
- when the selected geographic feature having a highest score does not have a geographic feature score equal to another geographic feature, the method further comprises:
- obtaining location point information from the geographic feature information of the selected geographic feature; and
- associating the named area datum with the obtained location point information; and
- when the selected geographic feature having a highest score has a geographic feature score equal to another geographic feature, the method further comprises:
- apply a tie-break criterion to the selected geographic feature and the another geographic feature;
- obtain location point information from the geographic feature information of the selected geographic feature winner of the tie-break; and
- associate the named area datum with the obtained location point information.

21. A non-transitory computer-readable medium comprising computer program code means to make a computer execute the method as claimed in claim 20.

* * * * *